(12) United States Patent  
Yoneyama

(10) Patent No.: US 9,761,010 B2
(45) Date of Patent: Sep. 12, 2017

(54) TRACKING APPARATUS

(71) Applicant: OLYMPUS CORPORATION, Hachioji-shi, Tokyo (JP)

(72) Inventor: Hisashi Yoneyama, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/067,721

(22) Filed: Mar. 11, 2016

(65) Prior Publication Data

US 2016/0196663 A1   Jul. 7, 2016

Related U.S. Application Data

(63) Continuation of application No. 14/052,311, filed on Oct. 11, 2013, now Pat. No. 9,317,748.

(30) Foreign Application Priority Data

Oct. 15, 2012   (JP) ................................. 2012-227758

(51) Int. Cl.
*G06K 9/00* (2006.01)
*G06T 7/20* (2017.01)
*H04N 5/232* (2006.01)
*G06T 7/73* (2017.01)
*G06T 7/11* (2017.01)
*G06T 7/246* (2017.01)

(52) U.S. Cl.
CPC .......... *G06T 7/204* (2013.01); *G06K 9/00261* (2013.01); *G06K 9/00268* (2013.01); *G06K 9/00664* (2013.01); *G06T 7/11* (2017.01); *G06T 7/248* (2017.01); *G06T 7/74* (2017.01); *H04N 5/23212* (2013.01); *H04N 5/23219* (2013.01)

(58) Field of Classification Search
None
See application file for complete search history.

(56) References Cited

U.S. PATENT DOCUMENTS

| | | |
|---|---|---|
| 2006/0182433 A1 | 8/2006 | Kawahara |
| 2007/0110305 A1 | 5/2007 | Corcoran |
| 2009/0174805 A1 | 7/2009 | Alberth |
| 2011/0019066 A1 | 1/2011 | Takano |
| 2012/0120283 A1 | 5/2012 | Capata |
| 2013/0050516 A1* | 2/2013 | Hojo .................. H04N 5/23267 348/208.6 |

FOREIGN PATENT DOCUMENTS

| | | |
|---|---|---|
| CN | 101911670 A | 12/2010 |
| JP | 2007-011054 | 1/2007 |
| JP | 2009-268086 | 11/2009 |

OTHER PUBLICATIONS

Office Action issued in corresponding Chinese Patent Application No. 201310479013.7 on May 5, 2016, consisting of 25 pp. (English Translation Provided).

* cited by examiner

*Primary Examiner* — Weiwen Yang
(74) *Attorney, Agent, or Firm* — Volpe and Koenig, P.C.

(57) ABSTRACT

A tracking apparatus includes a grouping setting unit, a tracking feature detection unit, a tracking unit. The grouping setting unit groups a plurality of focus detection areas with an in-focus state. The tracking feature detection unit detects a feature amount of the tracking target in areas of the groups grouped. The tracking unit tracks the tracking target in accordance with a first or second tracking position depending on the number of the set groups.

21 Claims, 13 Drawing Sheets

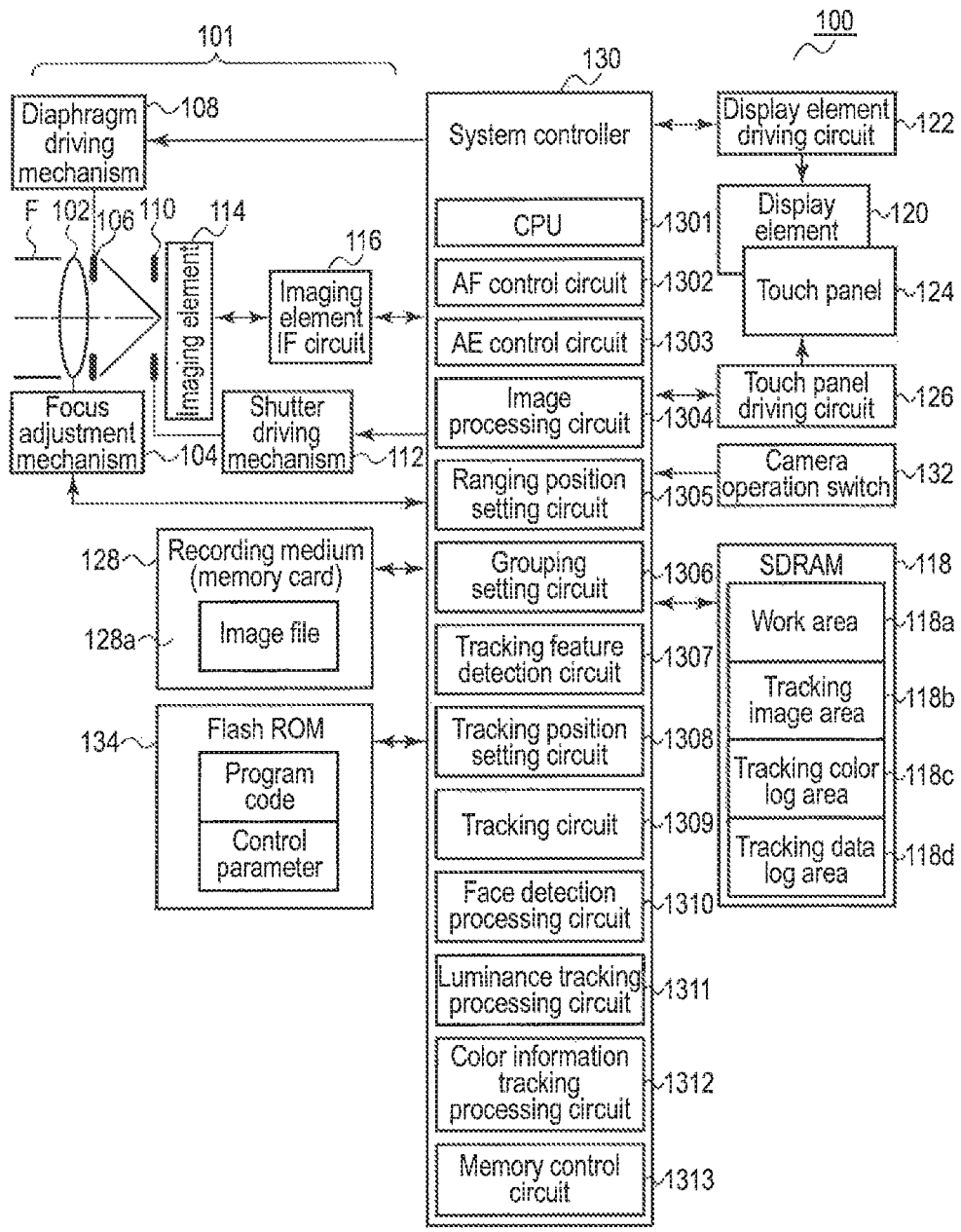
F I G. 1

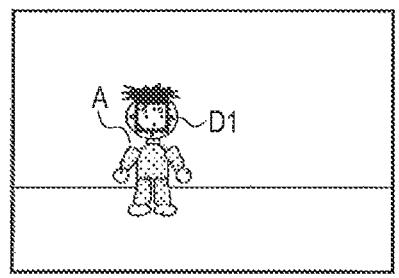
F I G. 9
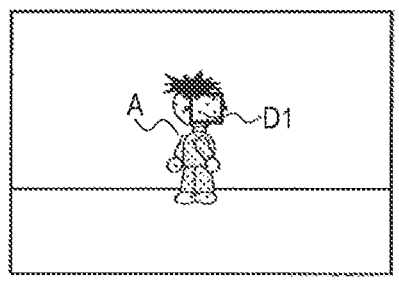
F I G. 10

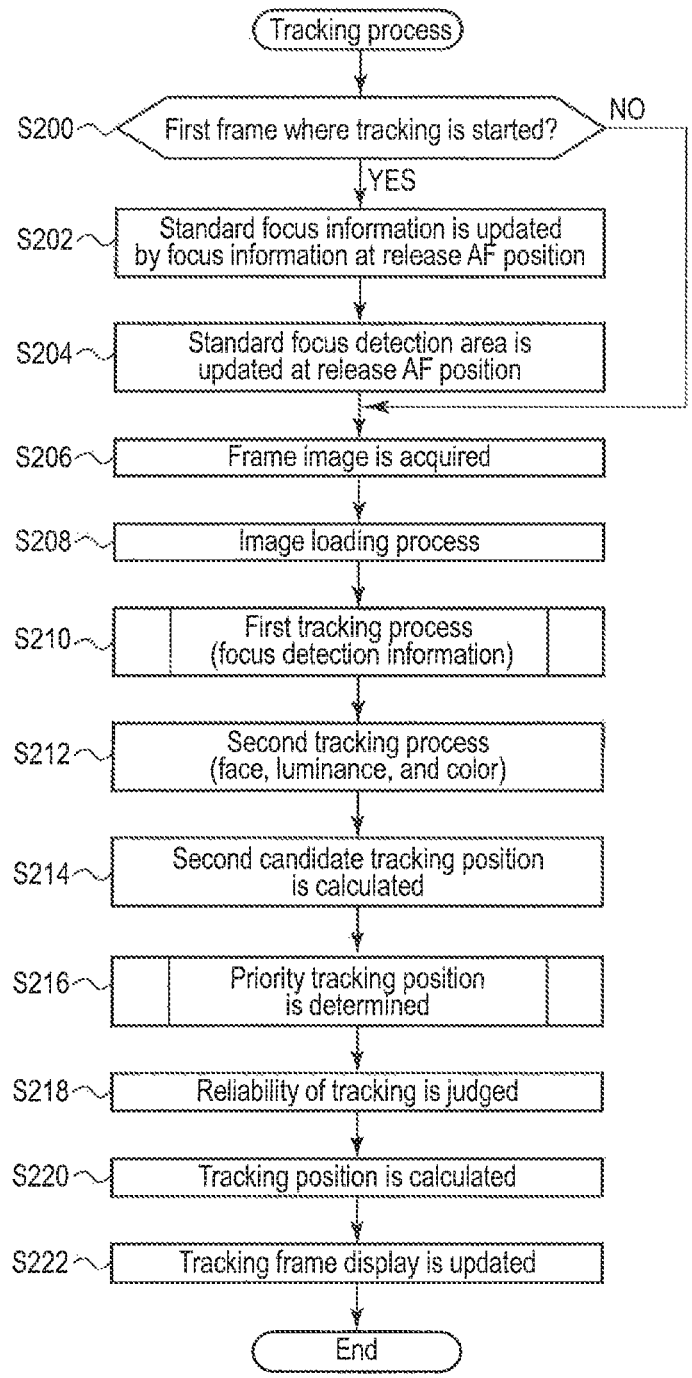
F I G. 11

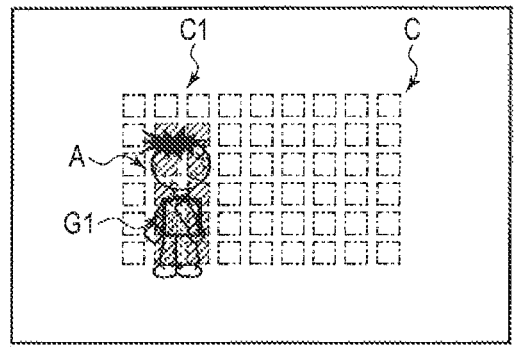
F I G. 16
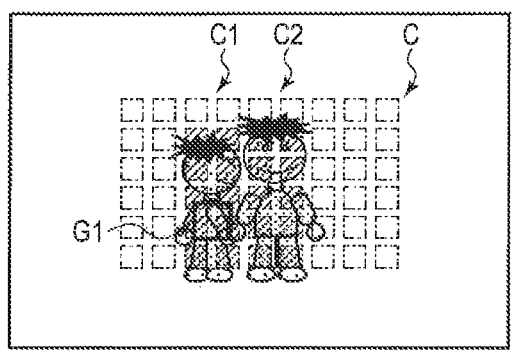
F I G. 17
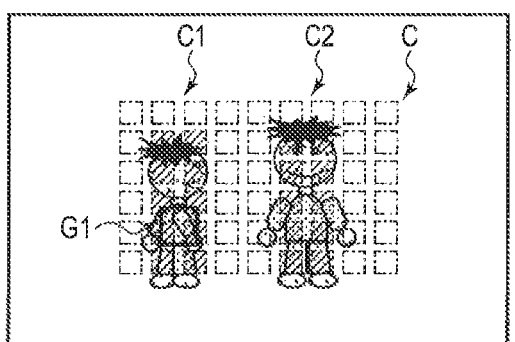
F I G. 18

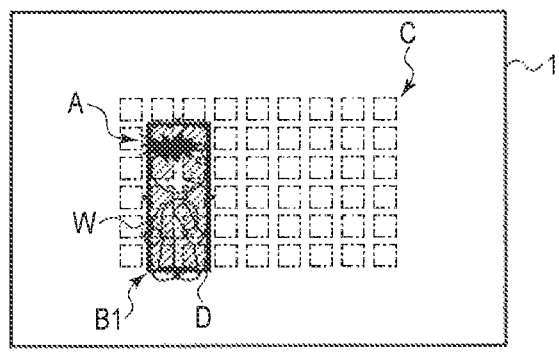
F I G. 22

TRACKING APPARATUS

CROSS-REFERENCE TO RELATED APPLICATIONS

This application is a continuation of U.S. patent application Ser. No. 14/052,311, filed Oct. 11, 2013, which claims the benefit of prior Japanese Patent application Ser. No. 2012-227758, filed Oct. 15, 2012, the entire contents of which are incorporated herein by reference.

BACKGROUND OF THE INVENTION

1. Field of the Invention

The present invention relates to a tracking apparatus which is applied to an imaging device such as a digital camera and which improves the performance of tracking a tracking target subject.

2. Description of the Related Art

Techniques for tracking a subject are known in, for example, Jpn. Pat. Appln. KOKAI Publication No. 2007-011054 and Jpn. Pat. Appln. KOKAI Publication No. 2009-268086. Jpn. Pat. Appln. KOKAI Publication No. 2007-011054 discloses the use of, for example, an AF evaluation value used in contrast autofocus (contrast AF) to track a subject. According to the disclosure in this publication, an autofocus lens is driven, and at the same time, a contrast detection signal are calculated regarding a plurality of AF areas in accordance with an output signal of an image pickup device. The movement of the subject between the AF areas is detected from the calculated contrast detection signal. An in-focus position is found in accordance with the detection result.

Jpn. Pat. Appln. KOKAI Publication No. 2009-268086 discloses tracking a subject by using at least two regions for tracking the subject. According to the disclosure in this publication, a first region and a second region for tracking the subject are provided on image data acquired by imaging the subject. The first region is always used as a standard region to track the subject. The second region is used independently of the first region to track the subject.

The tracking process is briefly described for reference. FIG. 21 shows an example of a frame image for a given timing in tracking operation. FIG. 22 shows an example of a frame image taken one frame later in the tracking operation. In an imaging screen 1 of a digital camera, a subject (subject to be tracked) A such as a person to be tracked exists, and a tracking frame W for tracking the subject A is displayed at a tracking position B1. A plurality of two-dimensionally arranged focus detection areas C are shown in the imaging screen 1. These focus detection areas C detect the in-focus state regarding the subject A. These focus detection areas C correspond to a plurality of two-dimensionally arranged focus detecting pixels in an image pickup device having a plurality of two-dimensionally arranged pixels, for example, in the digital camera.

The tracking frame W is set in accordance with the size of the subject A. In the tracking frame W, the number of the focus detection areas C used to track the subject A varies by the size of the tracking frame W. For example, in the frame image shown in FIG. 21, the tracking frame W has a size corresponding to the size of the tracking frame W. For example, ten focus detection areas C are included in the tracking frame W in accordance with the size of the tracking frame W. In the frame image taken one frame later shown in FIG. 22, the tracking frame W tracks the subject A moving rightward, and moves in the same rightward direction to reach a tracking position B1. The size of the tracking frame W does not change with tracking, and the number of the focus detection areas C included in the tracking frame W remains ten.

BRIEF SUMMARY OF THE INVENTION

A tracking apparatus according to an aspect of the present invention comprises: a grouping setting unit which groups a plurality of focus detection areas in accordance with an in-focus state among the focus detection areas in image data including a tracking target; a tracking feature detection unit which detects a feature amount of the tracking target in areas of the groups grouped by the grouping setting unit; and a tracking unit which sets the focus detection area focused on the tracking target as a first tracking position, sets a part having the feature amount detected by the tracking feature detection unit as a second tracking position, and tracks the tracking target in accordance with the first or second tracking position depending on the number of the set groups.

A tracking method according to an aspect of the present invention comprises: grouping a plurality of focus detection areas in accordance with an in-focus state among the focus detection areas in image data including a tracking target; detecting a feature amount of the tracking target in an area of the set group; setting the focus detection area focused on the tracking target as a first tracking position; setting a part having the feature amount of the tracking target as a second tracking position; and tracking the tracking target in accordance with the first or second tracking position depending on the number of the set groups.

BRIEF DESCRIPTION OF THE SEVERAL VIEWS OF THE DRAWING

FIG. 1 is a configuration diagram showing one embodiment of an imaging device comprising a tracking apparatus according to the present invention;

FIG. 9 is a diagram showing a tracking frame displayed on the face detected by the face detection processing circuit in the tracking apparatus;

FIG. 10 is a diagram showing the tracking frame displayed on the face detected by the face detection processing circuit in the tracking apparatus;

FIG. 11 is a tracking process flowchart in the tracking apparatus;

FIG. 16 is a composition showing a case in which one focus detection area group is provided for the subject in a priority tracking position determination in the tracking apparatus;

FIG. 17 is a composition showing a case in which one focus detection area group is provided when two subjects are located close to each other in the priority tracking position determination in the tracking apparatus;

FIG. 18 is a composition showing a case in which two focus detection area groups are provided when two subjects are located apart from each other in the priority tracking position determination in the tracking apparatus;

FIG. 22 is a diagram illustrating the background art;

DETAILED DESCRIPTION OF THE INVENTION

Figure 2:
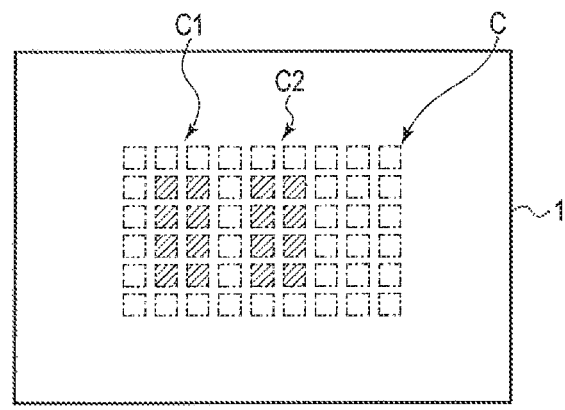
FIG. 2 is a diagram showing how focus detection areas are grouped in accordance with an in-focus state by a grouping setting circuit in the tracking apparatus.

Hereinafter, an embodiment of the present invention will be described with reference to the drawings.

FIG. 1 shows an example of a configuration diagram of an imaging device 100 comprising a tracking apparatus. The imaging device (main device) 100 comprises a photographic optical system 102, a focus adjustment mechanism 104, a diaphragm 106, a diaphragm driving mechanism 108, a shutter 110, a shutter driving mechanism 112, an imaging element 114, an imaging element interface (IF) circuit 116, an SDRAM 118, a display element 120, a display element driving circuit 122, a touch panel 124, a touch panel driving circuit 126, a recording medium 128, a system controller 130 equipped with a CPU 1301, a camera operation switch 132, and a flash ROM 134.

An imaging section 101 includes the photographic optical system 102, the focus adjustment mechanism 104, the diaphragm 106, the diaphragm driving mechanism 108, the shutter 110, the shutter driving mechanism 112, the imaging element 114, and the imaging element interface (IF) circuit 116.

The photographic optical system 102 focuses a light flux F from a subject on a light receiving surface of the imaging element 114. The photographic optical system 102 includes a plurality of lenses such as a focus lens. The focus adjustment mechanism 104 includes a motor and a driving circuit for the motor. The focus adjustment mechanism 104 drives the focus lens in the photographic optical system 102 in its optical axis direction (chain line direction shown) under the control of the CPU 1301.

The diaphragm 106 is configured to open/close, and adjusts the amount of the light flux F entering the imaging element 114 via the photographic optical system 102. The diaphragm driving mechanism 108 includes a driving mechanism for driving the diaphragm 106. The diaphragm driving mechanism 108 drives the diaphragm 106 under the control of the CPU 1301 in the system controller 130.

The shutter 110 allows the light receiving surface of the imaging element 114 to be shielded from light or exposed to light. The shutter 110 adjusts the exposure time of the imaging element 114. The shutter driving mechanism 112 includes a driving mechanism for driving the shutter 110. The shutter driving mechanism 112 drives the shutter 110 under the control of the CPU 1301 in the system controller 130.

The imaging element 114 includes the light receiving surface. The light flux F from the subject focused via the photographic optical system 102 is formed into an image on the light receiving surface of the imaging element 114. The light receiving surface of the imaging element 114 includes a plurality of two-dimensionally arranged pixels. A color filter is provided on the light entrance side of the light receiving surface of the imaging element 114. The imaging element 114 converts the figure (subject figure) corresponding to the light flux F formed into the image on the light receiving surface to an electric signal (hereinafter referred to as an image signal) corresponding to the light amount. Regarding the imaging element 114, imaging elements having various configurations are known, such as a CCD type imaging element and a CMOS type imaging element. Regarding the color arrangement of the color filter, various arrangements such as a Bayer arrangement are known. The present embodiment is not limited to a particular configuration of the imaging element 114 and can use imaging elements having various configurations.

The imaging element IF circuit 116 drives the imaging element 114 under the control of the CPU 1301, and reads the image signal output by the driving of the imaging element 114. The imaging element IF circuit 116 subjects the image signal read from the imaging element 114 to analog processing such as correlated double sampling (CDS) processing and automatic gain control (AGC) processing. The imaging element IF circuit 116 converts the analog-processed image signal to a digital signal (hereinafter referred to as image data).

For example, a work area 118a, a tracking image area 118b, a tracking color log area 118c, and a tracking data log area 118d are formed an storage areas in the SDRAM 118.

Data generated in each section of the imaging device 100 is temporarily stored in the work area 118a. The data temporarily stored in the work area 118a is, for example, image data obtained by the imaging element IF circuit 116.

Tracking image data is temporarily stored in the tracking image area 118b. The tracking image data is image data for a frame including a tracking target subject in a tracking process.

A color information log for tracking the tracking target subject is temporarily stored in the tracking color log area 118c.

A tracking data log is temporarily stored in the tracking data log area 118d. In the present embodiment, a plurality of tracking processes for, for example, the face of the subject, luminance information, and color information are used to track the subject. Thus, tracking data used in the tracking processes is temporarily stored in the tracking data log area 118d.

The display element 120 is, for example, a liquid crystal display (LCD). The display element 120 displays various images such as images for live view, and image data recorded in the recording medium 128. The display element 120 will hereinafter be referred to as an LCD 120. The display element driving circuit 122 drives the LCD 120 in accordance with the image data input under the control of the CPU 1301, and displays images on the LCD 120.

The touch panel 124 is integrally provided on a display screen of the LCD 120. The touch panel 124 detects, for example, the contact (touch) of the finger of a user with the display screen of the LCD 120, and outputs a contact detection signal including coordinates that indicates the touch position. The touch panel driving circuit 126 drives the touch panel 124, and sends, to the CPU 1301, the contact detection signal from the touch panel 124. The CPU 1301 detects the user's contact operation on the display screen from the contact detection signal sent from the touch panel 124, and performs processing corresponding to the contact operation.

The recording medium 128 is, for example, a memory card. An image file 128a obtained by photography operation is recorded in the recording medium 128. The image file 128a is formed by attaching a predetermined header to image data. For example, data indicating a photography condition and data indicating a tracking position are recorded in the header as tag data.

The system controller 130 controls the operation of the entire imaging device 100. The system controller 130 includes the CPU 1301; an AF control circuit 1302 and an AE control circuit 1303 as various control circuits; an image processing circuit 1304; a ranging position setting circuit 1305, a grouping setting circuit 1306, and a tracking feature detection circuit 1307 as focus detection information acquiring circuits; a tracking position setting circuit 1308 and a tracking circuit 1309 as tracking processing circuits; a face detection processing circuit 1310; a luminance tracking processing circuit 1311; a color information tracking processing circuit 1312; and a memory control circuit 1313.

The CPU 1301 controls the operations of the focus adjustment mechanism 104, the diaphragm driving mechanism 108, the shutter driving mechanism 112, the display element driving circuit 122, and the touch panel driving circuit 126, and also controls the operations of various control circuits inside the system controller 130.

Figure 21:
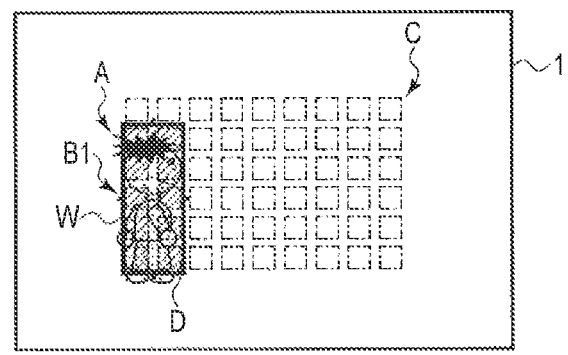
FIG. 21 is a diagram illustrating a background art for tracking.

The present device 100 includes a function to track the tracking target by controlling the operation of the CPU 1301. The tracking function includes a plurality of focus detection areas C as shown in FIG. 21. The tracking function tracks the subject A in accordance with each in-focus state of each of the focus detection areas C regarding the tracking target subject A in the image data.

The AF control circuit 1302 controls a contrast AF process. More specifically, the AF control circuit 1302 extracts a high-frequency component of the image data obtained by the imaging element IF circuit 116, and accumulates the extracted high-frequency component to acquire an in-focus evaluation value for AF. The CPU 1301 evaluates the contrast of the image data in accordance with the in-focus evaluation value, and at the same time, controls the focus adjustment mechanism 104, thereby adjusting the focus lens of the photographic optical system 102 to an in-focus position.

The AE control circuit 1303 controls AE operation. More specifically, the AE control circuit 1303 calculates subject luminance by using the image data obtained by the imaging element IF circuit 116. In accordance with the subject luminance, the AE control circuit 1303 calculates, for example, an opening amount (aperture value) of the diaphragm 106 during exposure, and a release time (shutter speed value) of the shutter 110.

The image processing circuit 1304 performs various kinds of image processing for the image data. The image processing includes, for example, color correction processing, gamma (γ) correction processing, and compression processing. The image processing circuit 1304 also expands compressed image data.

The focus detection information acquiring circuits include the ranging position setting circuit 1305, the grouping setting circuit 1306, and the tracking feature detection circuit 1307. The focus detection information acquiring circuits acquire the in-focus state regarding the subject A detected by the focus detection areas C shown in FIG. 21.

The ranging position setting circuit 1305 sets the focus detection area C which is focused on the tracking target subject A among the focus detection areas C. For example, as shown in FIG. 21, the ranging position setting circuit 1305 detects the in-focus state regarding the subject A in a plurality of focus detecting pixels in the focus detection area C.

The grouping setting circuit 1306 groups the focus detection areas C set by the ranging position setting unit 1305 in accordance with the in-focus state. For example, if there are two sets of focus detection areas C (shaded parts) which are focused on the subject A as shown in FIG. 2, the grouping setting circuit 1306 groups the sets of focus detection areas C into focus detection area groups C1 and C2. The formation of the focus detection area groups C1 and C2 means that there are two subjects.

Figure 3:
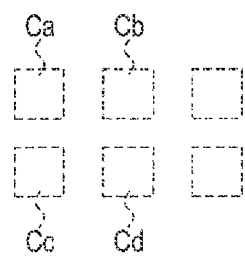
FIG. 3 is a diagram showing the operation of specific grouping by the grouping setting circuit in the tracking apparatus.

More specifically, when grouping, the grouping setting unit 1306 groups, as the same group, the focus detection areas which are adjacent to each other and which have the same focal distance among the focus detection areas C as shown in FIG. 3. For example, if the focus detection areas Ca and Cb are adjacent to each other and have the same focal distance, the grouping setting unit 1306 groups the focus detection areas Ca and Cb as the same group.

The adjacent focus detection areas C are not exclusively the left and right focus detection areas Ca and Cb in the diagram of FIG. 3, and may be the upper and lower focus detection areas Ca and Cc or may be the obliquely adjacent focus detection areas Ca and Cd.

Figure 4:
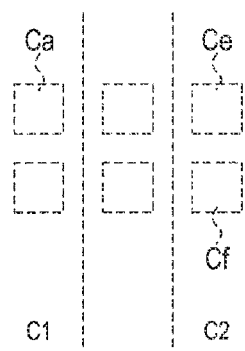
FIG. 4 is a diagram showing the operation of the specific grouping by the grouping setting circuit in the tracking apparatus.

When grouping, the grouping setting unit 1306 groups, into other groups such as the focus detection area groups C1 and C2, for example, the focus detection area Ca, the focus detection area Ce located a preset number of pixels apart from the focus detection area Ca, and the focus detection area Cf adjacent to the focus detection area Ce that have been set by the ranging position setting unit 1305 as shown in FIG. 4.

The tracking feature detection circuit 1307 detects the feature amount of the tracking target subject A in, for example, the areas of the focus detection area groups C1 and C2 grouped by the grouping setting unit 1306. The tracking feature detection circuit 1307 detects the face of a human body, luminance, and color as the feature amount of the subject A.

The tracking position setting circuit 1308 sets, as a first tracking position, the focus detection area C set by the ranging position setting unit 1308. The tracking position setting circuit 1308 sets, as a second tracking position, the part having the feature amount detected by the tracking feature detection circuit 1307, that is, the part having the face of the human body, the luminance, and the color as the feature amount of the subject A.

The tracking circuit 1309 tracks (first tracking process) the tracking target subject A on moving images comprising a plurality of successive frames in accordance with the first tracking position (focus detection area C) set by the tracking position setting unit 1308 depending on the number of groups set by the grouping setting unit 1306. Alternatively, the tracking circuit 1309 tracks (second tracking process) the tracking target subject A on moving images comprising a plurality of successive frames in accordance with the second tracking position (part having the face, the luminance, and the color as the feature amount of the subject A).

If the focus detection areas C are grouped into a plurality of groups, for example, the focus detection area groups C1 and C2 by the grouping setting unit 1306, the tracking circuit 1309 selects the first tracking position (focus detection area C) and the second tracking position (part having the face, the luminance, and the color as the feature amount of the subject A) in accordance with a positional relation between the second tracking position and the groups.

If no group is set by the grouping setting unit 1306, the tracking circuit 1309 selects the second tracking position (part having the face, the luminance, and the color as the feature amount of the subject A). When one group is set, the tracking circuit 1309 selects the first tracking position (focus detection area C). If a plurality of groups are set, the tracking circuit 1309 selects the first or second tracking position from the second tracking position and the focus detection areas C which are in the in-focus state.

In the case of moving images comprising a plurality of successive frames, the tracking circuit 1309 updates the first or second tracking position for each of frame images to track the tracking target subject A on a plurality of imaging data.

Figure 5A:
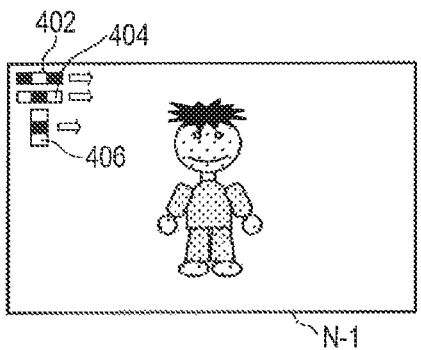
FIG. 5A is a diagram illustrating how the face of a subject is detected from image data by a face detection processing circuit in the tracking apparatus.
Figure 5B:
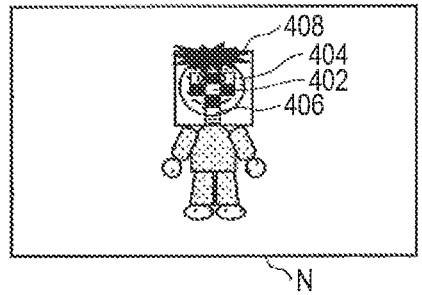
FIG. 5B is a diagram illustrating how the face of a subject is detected from image data by a face detection processing circuit in the tracking apparatus.

The face detection processing circuit 1310 detects the face of the subject (person) in the image data, and tracks this face. In a face detecting process, the amount of correlation between image data obtained in each frame of the moving images and, for example, each of face parts 402, 404, and 406 shown in FIG. 5A is found. The face part 402 is image data corresponding to a shade pattern around the nose of the person. The face part 404 is image data corresponding to a shade pattern around the eyes of the person. The face part 406 is image data corresponding to a shade pattern around the mouth of the person. The amount of correlation between the image data and each of the face parts 402, 404, and 406 is maximized at a predetermined arrangement that indicates the face of the person shown in FIG. 5B. If each correlation amount is maximum, the face is present in an area 408 including the face parts 402, 404, and 406. Although the face area is rectangular in the diagrams, the face area may be circular.

Figure 6A:
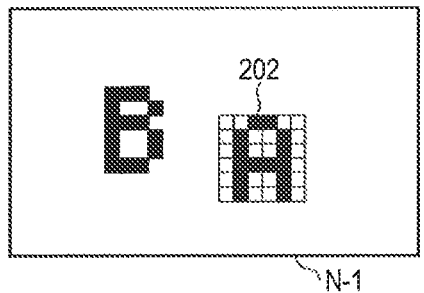
FIG. 6A is a diagram illustrating the function of tracking using luminance information by a luminance tracking processing circuit in the tracking apparatus.

The luminance tracking processing circuit 1311 tracks the subject A by using the luminance information in the image data. In the tracking process that uses the luminance information, the image data of an (N−1) frame is stored in the SDRAM 118 as evaluation image data, for example, if the tracking target is set in the (N−1) frame shown in FIG. 6A. The luminance tracking processing circuit 1311 sets the image data in a predetermined range 202 of the evaluation image data including the tracking target as standard image data (hereinafter, standard image data 202). The luminance tracking processing circuit 1311 then searches the reference image data for a part corresponding to the standard image data 202 included in the evaluation image data.

The tracking process of the N frame is described by way of example. First, the luminance tracking processing circuit 1311 stores the image data for the N frame in the SDRAM 118 as reference image data. The luminance tracking processing circuit 1311 finds the amount of correlation between image data in a predetermined search range 204 of the reference image data and the standard image data 202, and searches the image data in the predetermined search range 204 for a part corresponding to the standard image data 202. The correlation amount is determined, for example, from a difference absolute value sum (the accumulation of absolute values of luminance differences found for the respective pixels) between the standard image data and the reference image data.

Figure 6B:
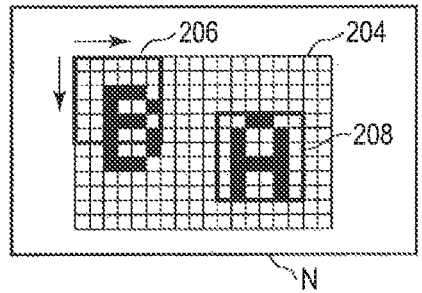
FIG. 6B is a diagram illustrating the function of tracking using luminance information by a luminance tracking processing circuit in the tracking apparatus.

For example, if the difference absolute value sum between the reference image data in an area 206 of the reference image data shown in FIG. 6B and the standard image data 202 is found, the area 206 of the reference image data and the standard image data 202 are obviously different image data, so that the difference absolute value sum is great. In contrast, if the difference absolute value sum between an area 208 of the reference image data and the standard image data 202 is found, the difference absolute value sum is small. Thus, the difference absolute value sum is smaller if the amount of correlation between the reference image data and the standard image data 202 is greater.

In the tracking process that uses the luminance information, the reference image data is searched for an area having the maximum correlation amount, that is, the minimum difference absolute value sum. In the example shown in FIG. 6B, the area having the minimum difference absolute value sum is the area 208.

In the tracking position log area, a position having the highest correspondence in the area 208 is recorded as a tracking position. If there are a plurality of positions to be recorded as tracking positions, for example, a position close to the center of the area 208 is used as the tracking position. In the next tracking process, this tracking position is preferably used as the start position of the tracking process. The time required for the tracking process can be reduced.

The color information tracking processing circuit 1312 tracks the subject, for example, the face of the person in accordance with feature information, for example, the color information from the image data acquired by the imaging in the imaging section 101. The color information tracking processing circuit 1312 uses the color information in the image data acquired by the imaging in the imaging section 101 to perform the tracking process of the face of the person.

The tracking process that uses the color information is briefly described. In the tracking process that uses the color information, an area determined to have the same color information as the color information set in the evaluation image data, that is, a tracking color area is searched for.

Figure 7A:
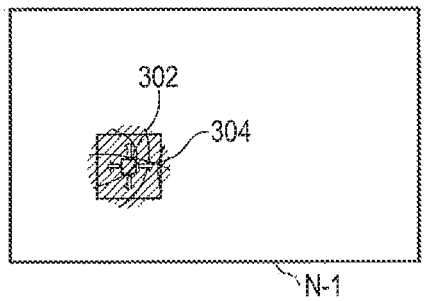
FIG. 7A is a diagram illustrating the function of tracking using color information by a color information tracking processing circuit in the tracking apparatus.

For example, when a given position 302 of the subject is specified in the (N−1) frame as shown in FIG. 7A, the color information tracking processing circuit 1312 acquires the color information at the position 302 in the evaluation image data. The color information tracking processing circuit 1312 uses the position 302 as the start position of the tracking process to search for an area having the same color information as the position 302.

More specifically, the color information tracking processing circuit 1312 sequentially acquires the color information from the position 302 as the start position to the periphery, and determines whether the acquired color information is the same as the color information at the position 302. If the color information is determined to be the same as the color information at the position 302, the color information tracking processing circuit 1312 includes the position 302 in the tracking color area. If the acquired color information cannot be determined to be the same as the color information at the position 302, the color information tracking processing circuit 1312 does not include the position 302 in the tracking color area.

As a result of searching for the tracking color area in this way, a rectangular area 304 inscribed in the subject is the tracking color area, for example, when the subject has a single color as shown in FIG. 7A. The tracking position to be recorded in the tracking position log area is the same as, for example, the gravity center position of the tracking color area 304, for example, the position 302 shown in FIG. 7A. In the next tracking process, the tracking position (position 302) is used as the start position of the tracking process.

Figure 7B:
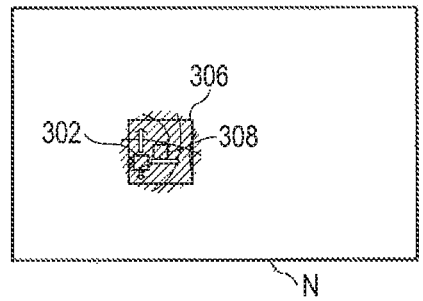
FIG. 7B is a diagram illustrating the function of tracking using color information by a color information tracking processing circuit in the tracking apparatus.

The tracking process of the N frame is shown by way of example. The color information tracking processing circuit 1312 uses the tracking position 302 of the (N−1) frame as the start position of the tracking process, in a predetermined search range of the image data of the N frame stored as the reference image data shown in FIG. 7B. The color information tracking processing circuit 1312 searches for areas which can be determined to have the same color information as the color information in the tracking color area 304, as tracking color areas sequentially from the periphery of the tracking position 302. In the example shown in FIG. 7B, an area 306 is the tracking color area. The color information tracking processing circuit 1312 sets a gravity center position 308 as a tracking position, and records this tracking position 308 in the tracking position log area. In the tracking color area log area, information (e.g. the positions of four corners) indicating the range of the tracking color area 306 is recorded.

The memory control circuit 1313 is an interface which is controlled, for example, by the CPU 1301 to access the SDRAM 118, the recording medium 128, and the flash ROM 134.

The camera operation switch 132 includes various operation members to be operated by the user. For example, the camera operation switch 132 includes a release button, a moving image button, a mode dial, a selection key, and a power supply button.

The release button includes a first release switch and a second release switch. The first release switch is turned on when the release button is pressed halfway by the user. If the first release switch is turned on, photographic preparation operation such as an AF process is performed. The second release switch is turned on when the release button is fully pressed by the user. If the second release switch is turned on, exposure operation for still image photography is performed.

The moving image button is an operation member for indicating the start or end of moving image photography. If the moving image button is pressed by the user, a moving image photography process is started. If the moving image button is pressed during the execution of the moving image photography process, the moving image photography process is ended.

The mode dial is an operation member for selecting a photography setting of the imaging device. In the present embodiment, for example, a still image photography mode and a moving image photography mode can be selected as the photography setting of the imaging device. The still image photography mode is a photography setting for still image photography. The moving image photography mode is a photography setting for moving image photography.

The selection key is an operation member for selecting or deciding an item, for example, on a menu screen. If the selection key is operated by the user, an item is selected or decided on the menu screen.

The power supply button is an operation member for turning on or off the power supply of the present device 100. If the power supply button is operated by the user, the present device 100 is activated and becomes operable. If the power supply button is operated while the present device is activated, the present device 100 is set to a power saving standby state.

A program code for the CPU 1301 to perform various kinds of processing is stored in the flash ROM 134. Various control parameters are also stored in the flash ROM 134, such as a photography operation flowchart of the present device 100, control parameters necessary for the operations of the photographic optical system 102, the diaphragm 106, and the imaging element 114, and control parameters necessary for image processing in the image processing circuit 1304. In the flash ROM 134, for example, data for face parts used in the face detection in the face detection processing circuit 1310, and data for displaying a tracking frame are also stored.

Figure 8:
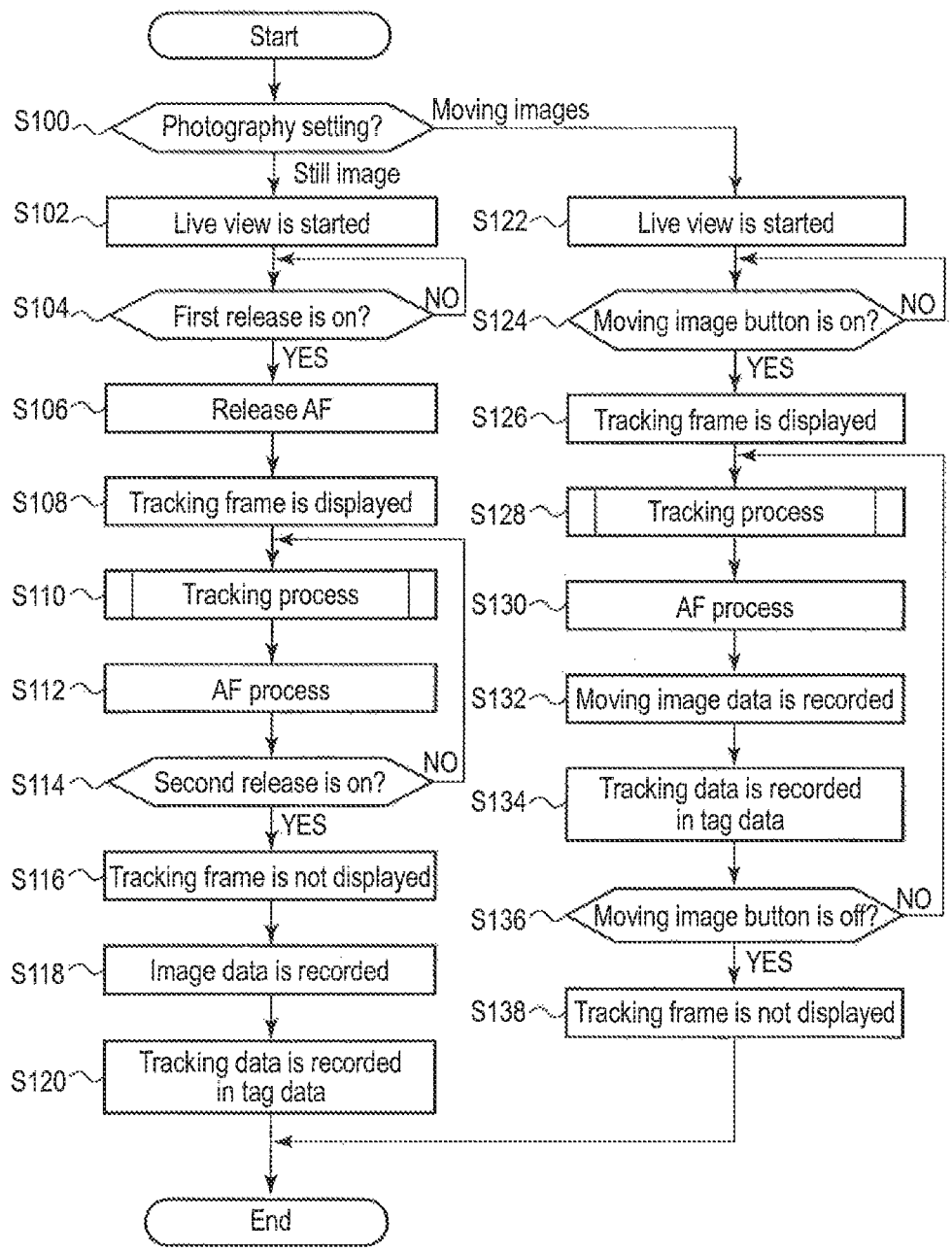
FIG. 8 is an imaging operation flowchart in the tracking apparatus.

Now, the photography operation of the present device having the above-mentioned configuration is described with reference to a photography operation flowchart shown in FIG. 8.

The CPU 1301 reads a necessary program code from the flash ROM 134 to control the operation of the present device 100.

In step S100, the CPU 1301 determines whether the current photography setting of the present device 100 is the still image photography mode or the moving image photography mode. The photography setting is set by the mode dial.

When the photography setting is determined to be the still image photography mode, the CPU 1301 starts a live view operation in step S102. The live view operation is as follows. The CPU 1301 controls the shutter driving mechanism 112 to release the shutter 110, and then controls the imaging element IF circuit 116 to start the imaging by the imaging element 114. The CPU 1301 then inputs, to the image processing circuit 1304, the image data which has been stored in the work area of the SDRAM 118 as a result of the imaging by the imaging element 114 so that the image data is subjected to image processing for live view display. The CPU 1301 then inputs, to the display element driving circuit 122, the image data which has been subjected to the image processing for the live view display, and displays an image on the display element 120. The CPU 1301 displays moving images of the subject by repeating the above-described display operation (live view display). The user can observe the subject by the moving image display.

In step S104, the CPU 1301 determines whether the first release switch has been turned on. By performing this determination, the CPU 1301 continues the live view operation until determining that the first release switch has been turned on.

If it is determined that the first release switch has been turned on, the CPU 1301 performs a release AF process in step S106. In the release AF, the CPU 1301 drives the focus lens to an in-focus position by scan drive. That is, in the scan drive, the CPU 1301 controls the focus adjustment mechanism 104 to drive the focus lens in one direction within a predetermined scan range, and at the same time, evaluates in-focus evaluation values sequentially calculated by the AF control circuit 1302. The CPU 1301 stops the driving of the focus lens at a lens position where contrast is maximized as a result of the evaluation of the in-focus evaluation values. Such scan drive is performed when there is a great difference between the position of the focus lens before AF and the in-focus position.

In step S108, the CPU 1301 controls the display element driving circuit 122 to display a tracking frame W on the display element 120, for example, as shown in FIG. 21. The tracking frame W is displayed at the position of the tracking target subject A on the screen of the display element 120. For example, if the subject A brought into focus by the release AF is set as a tracking target, the tracking frame W may be displayed on this subject A.

If the face of the subject A is detected by the face detection processing circuit 1310, the tracking frame D1 may be displayed on the face, for example, as shown in FIG. 9 or FIG. 10. If the subject A displayed on the screen of the display element 120 is specified by the touch panel 124, the tracking frame D1 may be displayed on the subject A.

In step S110, the CPU 1301 performs a tracking process to track the subject A.

In step S112, the CPU 1301 performs an AF process to focus on the subject at the tracking position, and performs an AE process so that the exposure for the subject A at the tracking position will be proper. In the AF process after the tracking process, the focus lens is driven to the in-focus position by the scan drive or wobbling drive. In the wobbling drive, the CPU 1301 determines whether the in-focus evaluation value calculated by the AF control circuit 1302 when the focus lens is driven has increased as compared with the in-focus evaluation value at the previous lens position.

If it is determined that the in-focus evaluation value has increased, the CPU 1301 slightly drives the focus lens in the same direction as the previous direction. If the in-focus evaluation value has decreased, the CPU 1301 slightly drives the focus lens in a direction opposite to the previous direction. The CPU 1301 rapidly repeats such operation to gradually drive the focus lens to the in-focus position.

In the AE process, the CPU 1301 calculates an opening amount (aperture value) of the diaphragm 106 and a release time (shutter speed value) of the shutter 110 during this exposure so that the luminance of the subject at the tracking position calculated by the AE control circuit 1303 will reach a predetermined proper amount (proper exposure amount).

In step S114, the CPU 1301 determines whether the second release switch has been turned on. If it is determined that the second release switch has not been turned on, the CPU 1301 performs processes after the tracking process in step S110. If set to the still image photography mode, the CPU 1301 continues the tracking process until the second release switch is turned on.

If the second release switch is turned on, the CPU 1301 controls the display element driving circuit 122 so that a tracking frame D1 is not displayed, in step S116.

In step S118, the CPU 1301 performs a process to record still image data in the recording medium 128. During the recording process, the CPU 1301 controls the shutter driving mechanism 112 to close the shutter 110. The CPU 1301 then controls the diaphragm driving mechanism 108 to narrow the diaphragm 106 to the previously calculated aperture value. The CPU 1301 then controls the shutter driving mechanism 112 to release the shutter 110 for the previously calculated release time, and at the same time, performs the photography (exposure) by the imaging element 114.

The CPU 1301 processes, in the image processing circuit 1304, the still image data obtained via the imaging element 114. The CPU 1301 adds a header to the still image data processed in the image processing circuit 1304 to generate a still image file, and records the generated still image file in the recording medium 128.

In step S120, the CPU 1301 additionally writes data that indicates the tracking position obtained as a result of the tracking process in step S110 in the still image file previously recorded in the recording medium 128.

On the other hand, when the photography setting is determined to be the moving image photography mode in step S100, the CPU 1301 starts the live view operation in step S122.

If it is determined that the moving image button which is an instruction to turn on the moving image photography has been turned on, the CPU 1301 controls the display element driving circuit 122 in step S126 so that the tracking frame D1 is displayed over the face on the display element 120, for example, as shown in FIG. 9 or FIG. 10.

In step S128, the CPU 1301 performs a tracking process to track the subject A.

In step S130, the CPU 1301 instructs the AF control circuit 1302 to perform an AF process to bring the subject A at the tracking position into focus, and instructs the AE control circuit 1303 to perform an AE process so that the exposure for the subject A at the tracking position will be proper. In this AF process, the CPU 1301 drives the focus lens of the photographic optical system 102 to the in-focus position by the wobbling drive.

In step S132, the CPU 1301 performs a process to record moving image data in the recording medium 128. During the recording process, the CPU 1301 controls the diaphragm driving mechanism 108 to narrow the diaphragm 106 to the aperture value calculated in the AE process. The CPU 1301 then causes the imaging element 114 to perform imaging (exposure) for a time corresponding to the shutter speed value calculated in the AE process. After the end of the exposure, the CPU 1301 generates a moving image file and records the moving image file in the recording medium 128. The CPU 1301 processes, in the image processing circuit 1304, the moving image data obtained via the imaging element 114, and records, in the moving image file, the moving image data processed in the image processing circuit 1304.

In step S134, the CPU 1301 records data that indicates the tracking position obtained as a result of the tracking process in step S128 in the moving image file previously recorded in the recording medium 128.

In step S136, the CPU 1301 determines whether the moving image button has been turned off. When it is determined that the moving image button has not been turned off, the CPU 1301 performs processes after the tracking process in step S128.

Thus, in the moving image photography mode, the tracking process and the recording of the moving image data are continued until the moving image button is turned off. If it is determined that the moving image button has been turned off, the CPU 1301, in step S138, controls the display element driving circuit 122 so that the tracking frame D1 is not displayed.

Now, the tracking process is described with reference to a tracking process flowchart shown in FIG. 11.

In step S200, the CPU 1301 determines whether image data is the image data of the first frame where the tracking of the subject A is started.

Figure 12:
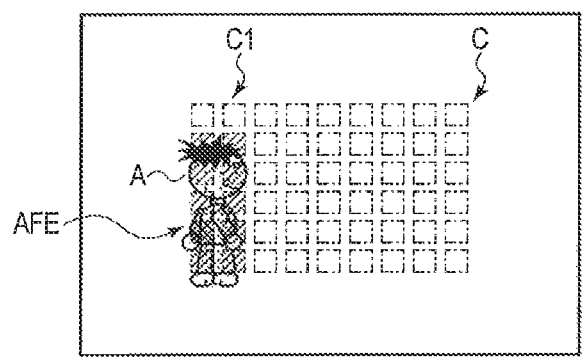
FIG. 12 is a diagram showing a release AF in-focus area in a release AF process in the tracking apparatus.

If the frame is determined to be the first frame where the tracking is started, the CPU 1301 performs the release AF for a release AF in-focus area AFE shown in FIG. 12 if the first release switch is turned on in step S202. In this release AF process, the CPU 1301 performs the scan drive to drive the focus lens to the in-focus position. The CPU 1301 performs the release AF process, and stops the driving of the focus lens at the in-focus position regarding the subject A. The CPU 1301 updates the in-focus position regarding the subject A as standard focus information.

In step S204, the ranging position setting circuit 1305 updates the standard focus detection areas C (shaded parts) as shown in FIG. 12 in the release AF in-focus area AFE.

In step S206, the CPU 1301 causes the imaging element 114 to perform imaging, and causes the imaging element IF circuit 116 to acquire frame image data. In step S208, the CPU 1301 loads the frame image data into the SDRAM 118.

In step S210, the CPU 1301 sets to perform the first tracking process for the subject A in accordance with a focus detection area F set by the ranging position setting circuit 1305, that is, in accordance with the focus detection area F which is focused on the tracking target subject A among the focus detection areas C.

In step S212, the tracking feature detection circuit 1307 detects the feature amount of the subject A for the second tracking process in, for example, the areas of the focus detection area groups C1 and C2 grouped by the grouping setting circuit 1306. The tracking feature detection circuit 1307 detects the face of a human body, luminance, and color as the feature amount of the subject A.

Figure 13:
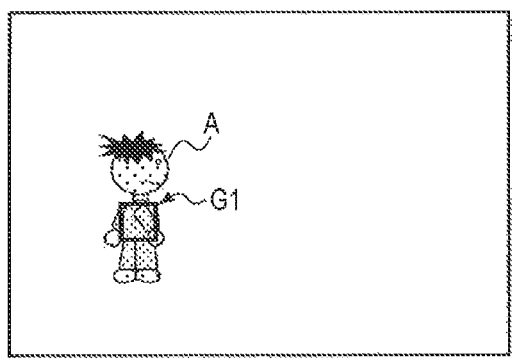
FIG. 13 is a diagram showing a luminance/color information tracking area in which the subject is tracked by a tracking feature detection circuit in the tracking apparatus.

In step S214, the tracking feature detection circuit 1307 calculates a tracking position of the subject A in accordance with the face of the human body, luminance, and color information as the feature amount of the subject A. FIG. 13 shows a luminance/color information tracking area G1 in which the subject A is tracked in accordance with the luminance and color information regarding the subject A.

In step S216, the CPU 1301 performs a priority tracking position determination to determine whether to prioritize the first tracking process for the subject A in accordance with the focus detection area F which is focused on the tracking target subject A or the second tracking process for the subject A in accordance with the face of the human body, luminance, and color as the feature amount of the subject A.

In step S218, the CPU 1301 determines the reliability of the first tracking process or the second tracking process which has been determined as a result of the priority tracking position determination. In step S220, the CPU 1301 calculates a tracking position of the subject A. In step S222, the CPU 1301 updates the position and size of the tracking frame W shown in FIG. 21.

Figure 14A:
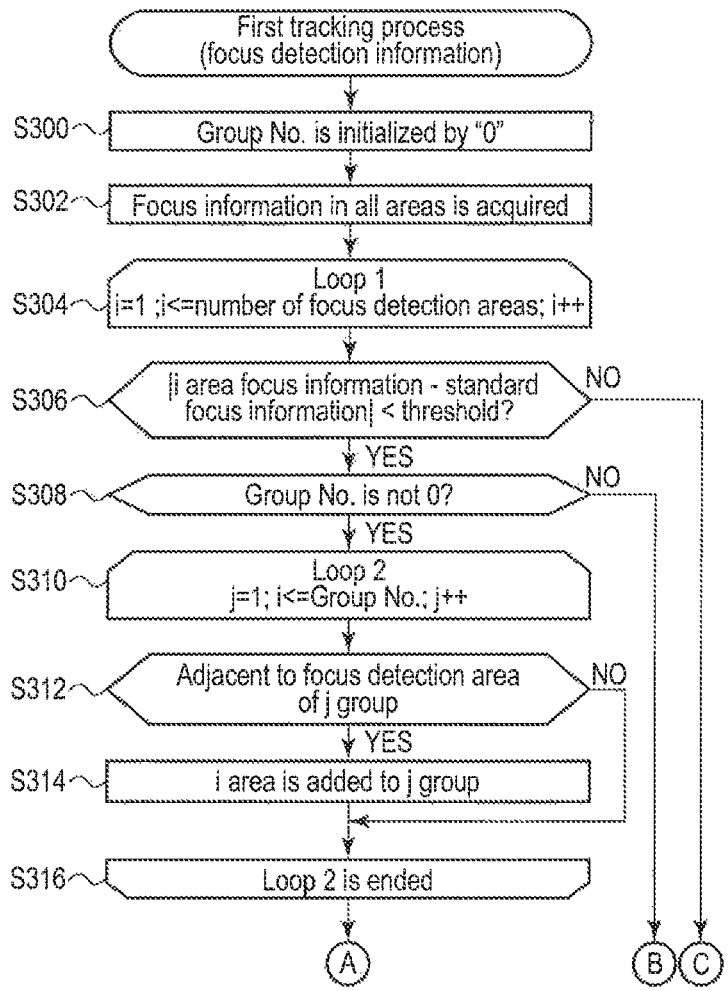
FIG. 14A is a first tracking process flowchart in the tracking apparatus.
Figure 14B:
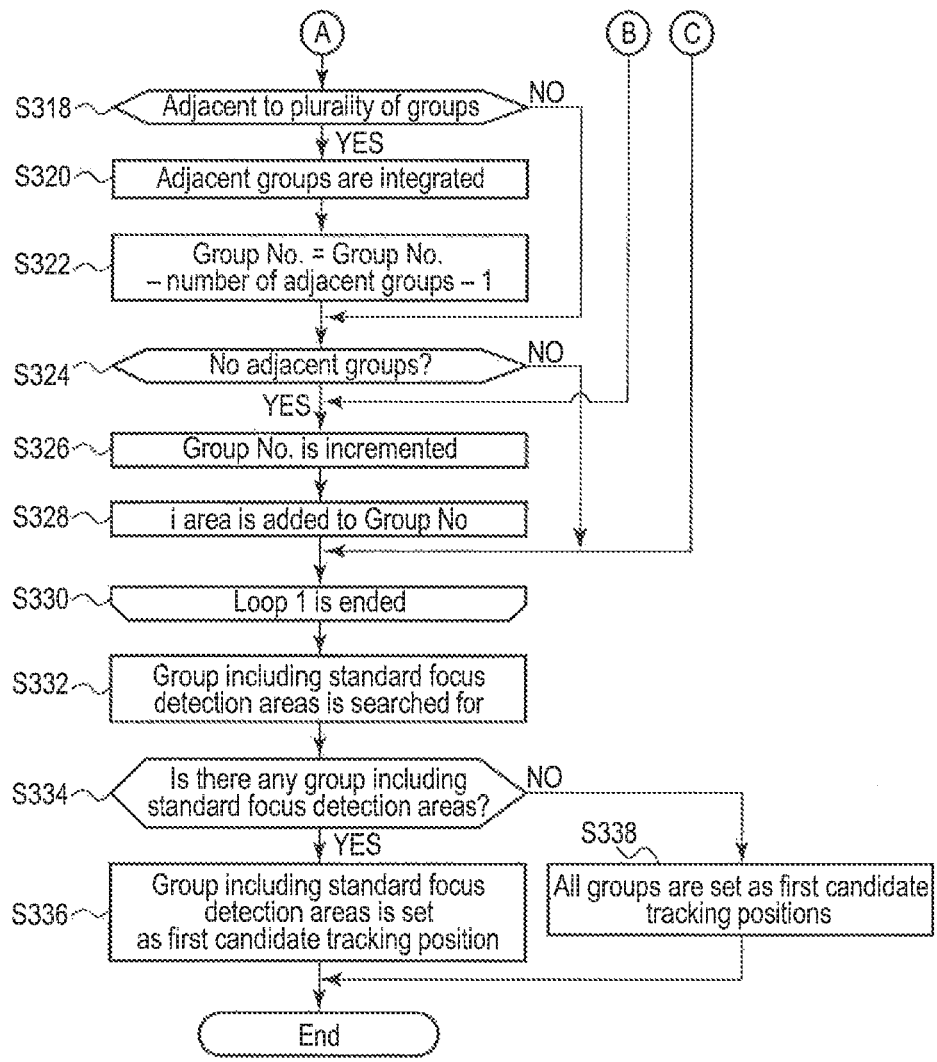
FIG. 14B is a first tracking process flowchart in the tracking apparatus.

Now, the operation of the first tracking process is described with reference to a first tracking process flowchart shown in FIG. 14A,14B.

In step S300, the grouping setting circuit 1306 initializes, to "0", a group number (No.) for grouping the focus detection areas C in accordance with the in-focus state. For example, the grouping setting circuit 1306 initializes, to "0", the Group No. given to the focus detection area groups C1 and C2 shown in FIG. 2.

In step S302, the ranging position setting circuit 1305 inputs image signals from all the focus detecting pixels in the imaging element 114, and acquires focus information regarding, for example, the in-focus state regarding the subject A in all the focus detection areas C. The focus information makes it possible to determine whether or not the subject A is in focus in each of the focus detection areas C, for example, shown in FIG. 12.

In step S304, the grouping setting circuit 1306 sets an area number i of the focus detection areas C. The grouping setting circuit 1306 first sets the area number i to "1", and then repeats a loop "1". In the loop "1", whether to group each of the focus detection areas C (i=1, 2, 3, . . . , n) into the focus detection area group C1 or C2 is determined.

In step S306, the grouping setting circuit 1306 finds an absolute value of a difference between the focus information regarding the focus detection areas C and standard focus information as shown in Equation (1), and determines whether this absolute value is less than a preset threshold.

$$|\text{Focus information regarding focus detection areas } C-\text{standard focus information}|<\text{threshold} \quad (1)$$

If it is determined that the absolute value of the difference between the focus information regarding the focus detection areas C and the standard focus information is less than the threshold, the grouping setting circuit 1306 determines in step S308 whether the area number i of the focus detection areas C is "0".

If it is determined that the area number i of the focus detection areas C is not "0", that is, the area number i is "1", the grouping setting circuit 1306 moves to a loop "2" in step S310.

In the loop "2", the grouping setting circuit 1306 sets the focus detection area Group No. to J(=1).

In step S312, the grouping setting circuit 1306 determines whether the focus detection area C is in the same group as the focus detection area group No. J(=1). In this determination, it is found out whether the determination target focus detection area C is adjacent to the focus detection area C of the focus detection area group No. J(=1).

If it is determined that the focus detection area C is adjacent, the grouping setting circuit 1306 adds the determination target focus detection area C as the focus detection area which is in the same group as the focus detection area group No. J(=1) in step S314.

If it is determined that the focus detection area C is not adjacent, the grouping setting circuit 1306 does not add the determination target focus detection area C as the focus detection area which is in the same group as the focus detection area group No. J(=1). The grouping setting circuit 1306 repeats steps S312 and S314, and determines the adjacent focus detection areas C in the same group for each of the focus detection area groups No. J(=1, 2, 3, . . . , m).

In step S318, the grouping setting circuit 1306 determines whether the determination target focus detection area C is adjacent to a plurality of focus detection area groups, for example, the groups No. J(=1, 2, 3).

If it is determined that the determination target focus detection area C is adjacent to a plurality of focus detection area groups, the grouping setting circuit 1306 integrates the adjacent focus detection area groups, for example, the groups No. J(=1, 2, 3) into one group No. J(=1) in step S320.

In step S322, the grouping setting circuit 1306 modifies the group No. J in accordance with Equation (2).

$$\text{Group No. } J=\text{group No. } J-\text{number of adjacent Groups}-1 \quad (2)$$

In step S324, the grouping setting circuit 1306 determines whether there is any focus detection area group No. J to which the determination target focus detection area C is adjacent.

If it is determined that there is no adjacent focus detection area group No. J, the grouping setting circuit 1306 increments the focus detection area group No. J in step S326. In step S328, the grouping setting circuit 1306 adds the focus detection areas C (i=1, 2, 3, . . . , n) to the focus detection area group No. J.

In step S330, the grouping setting circuit 1306 repeats the above loop "1".

In step S332, the grouping setting circuit 1306 searches for a focus detection area group No. J that includes the standard focus detection areas C.

As a result of the search, the grouping setting circuit 1306 determines in step S334 whether there is any focus detection area group No. J that includes the standard focus detection areas C.

If it is determined that there is a focus detection area group No. J that includes the standard focus detection areas C, the grouping setting circuit 1306 sets the focus detection area group No. J that includes the standard focus detection areas C as the first tracking position in step S336.

On the other hand, if there is no focus detection area group No. J that includes the standard focus detection areas C, the grouping setting circuit 1306 sets all the focus detection area groups No. J as the first tracking positions in step S338.

As described above, if the focus detection areas, for example, the focus detection areas Ca and Cb are adjacent to each other and have the same focal distance among a plurality of focus detection areas C as shown in FIG. 3, the grouping setting circuit 1306 groups these focus detection areas Ca and Cb as the same group.

The adjacent focus detection areas C are not exclusively the left and right focus detection areas Ca and Cb in the diagram of FIG. 3, and may be the upper and lower focus detection areas Ca and Cc or may be the obliquely adjacent focus detection areas Ca and Cd.

The grouping setting circuit 1306 searches for the focus detection area Ce and this focus detection area Ce located a preset number of pixels apart from, for example, the focus detection area Ca set by the ranging position setting circuit 1305 as shown in FIG. 4. The grouping setting circuit 1306 groups the focus detection area Ce and the focus detection area Cf adjacent to the focus detection area Ce into other groups such as the focus detection area groups C1 and C2.

Figure 15:
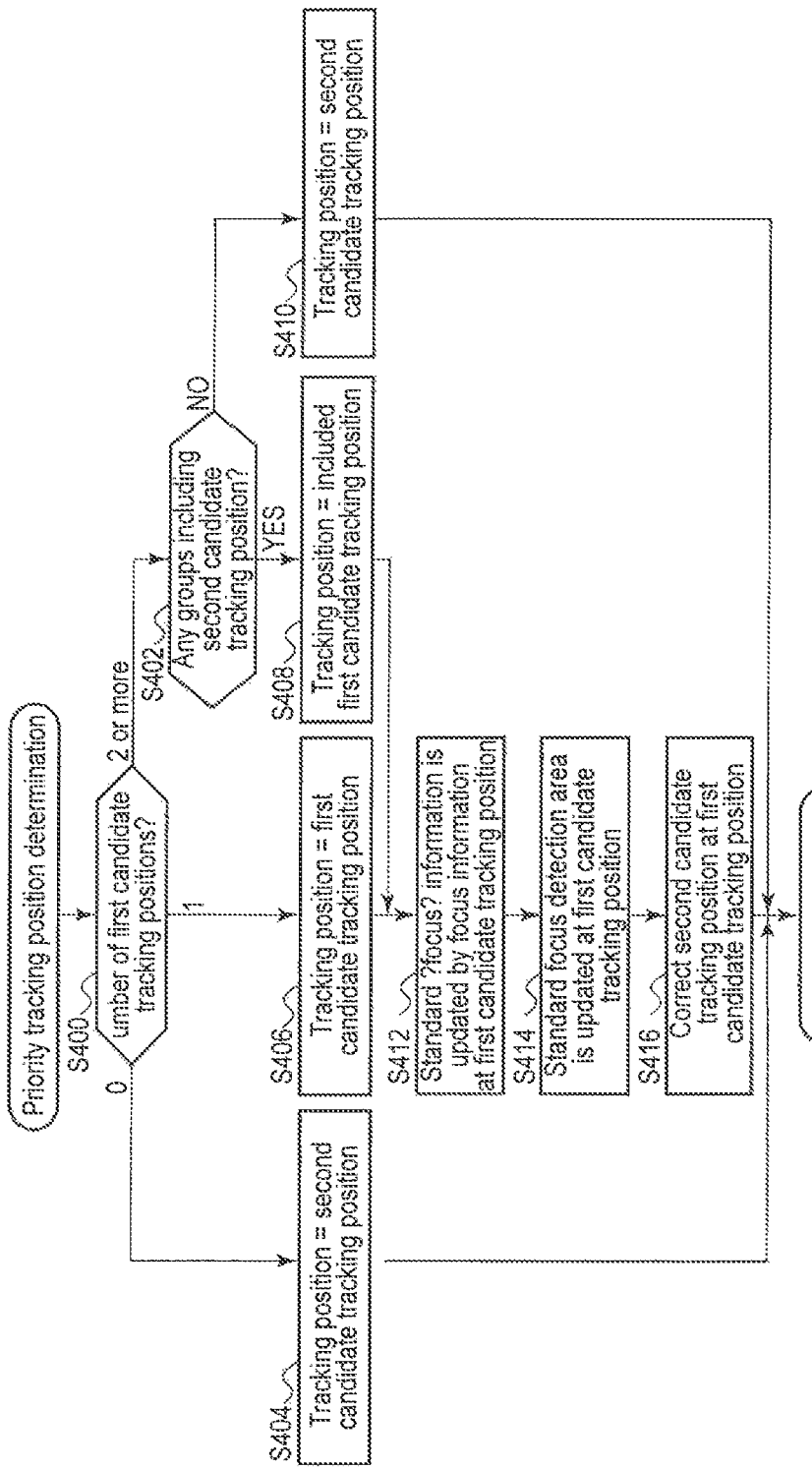
FIG. 15 is a priority tracking position determination flowchart in the tracking apparatus.

Now, the operation of the priority tracking position determination is described with reference to a priority tracking position determination flowchart shown in FIG. 15.

The tracking circuit 1309 tracks the tracking target subject A in accordance with the first tracking position (focus detection area C) set by the tracking position setting circuit 1308 depending on the number of groups set by the grouping setting circuit 1306, or in accordance with the second tracking position (part having the face, the luminance, and the color as the feature amount of the subject A).

More specifically, in step S400, the tracking circuit 1309 determines whether the number of groups at the first tracking position (focus detection area C) is "0", "1", or "2 or more".

If it is determined that the number of groups at the first tracking position (focus detection area C) is "0", the tracking circuit 1309 selects the second tracking position (part having the face, the luminance, and the color as the feature amount of the subject A) in step S404, and sets the second tracking position as the tracking position.

If it is determined that the number of groups at the first tracking position (focus detection area C) is "1", the tracking circuit 1309 selects the first tracking position (focus detection area C) in step S406, and sets the first tracking position as the tracking position. For example, FIG. 16 shows the composition of the subject A having one focus detection area group C1.

In step S412, the tracking circuit 1309 updates the standard focus information in accordance with the focus information regarding the first tracking position (focus detection area C).

In step S414, the tracking circuit 1309 updates the standard focus detection areas C in accordance with the focus information regarding the first tracking position (focus detection area C).

In step S416, the tracking circuit 1309 corrects the second tracking position (part having the face, the luminance, and the color as the feature amount of the subject A) in accordance with the first tracking position (focus detection area C).

If it is determined that the number of groups at the first tracking position (focus detection area C) is "2 or more", the tracking circuit 1309 determines in step S402 whether the focus detection area groups C1 and C2 that include the second tracking position (part having the face, the luminance, and the color as the feature amount of the subject A) exit. For example, FIG. 17 shows a composition in which two subjects A and E are located close to each other. FIG. 18 shows a composition in which the two subjects A and E are located apart from each other. The two subjects A and E that are located apart from each other correspond to having two focus detection area groups C1 and C2, that is, two or more groups.

If it is determined that the focus detection area groups C1 and C2 that include the second tracking position exist, the tracking circuit 1309 sets the focus detection area groups C1 and C2 that include the second tracking position as the first tracking position (focus detection area C) in step S408, updates the standard focus detection areas C in accordance with the focus information regarding the first tracking position, and moves to step S412.

On the other hand, if the focus detection area groups C1 and C2 that include the second tracking position do not exist, the tracking circuit 1309 updates the standard focus detection areas C in accordance with the second tracking position (part having the face, the luminance, and the color as the feature amount of the subject A) in step S410.

In this way, according to the first embodiment, the focus detection area C which is focused on the subject A is set among the focus detection areas C. The focus detection areas C are grouped in accordance with the in-focus state. The feature amount of the subject A in the areas of the focus detection area groups C1 and C2 is detected. The focus detection area C which is in the in-focus state is set as the first tracking position, or a part having the feature amount of the subject A is set as the second tracking position. The subject A is tracked in accordance with the first or second tracking position depending on the number of the focus detection area groups C1 and C2. Consequently, according to the first embodiment, even if the additional subject E exists in the vicinity of or adjacent to the subject A, the tracking target subject A can be reliably tracked and the reliability can be improved without a transfer from the subject A to the additional subject E.

If the focus detection areas C are grouped as the focus detection area group, the second tracking position is selected if there is no focus detection area group. If there is one group, the first tracking position is selected. If there are two or more groups, the first or second tracking position is selected from the second tracking position and the focus detection areas C which are in the in-focus state. Thus, for example, even if the two subjects A and E that have been located close to each other as shown in FIG. 17 come apart as shown in FIG. 18, the tracking target does not transfer from the subject A to the subject E, and the subject A can be kept tracked as the tracking target.

Figure 19:
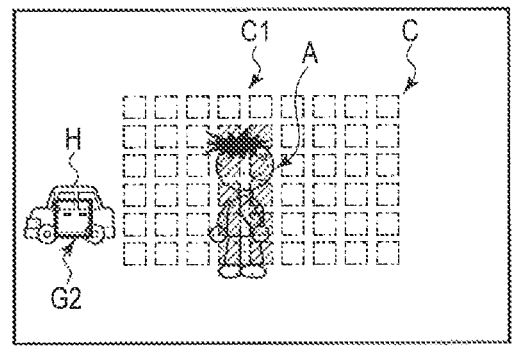
FIG. 19 is a diagram illustrating tracking operation in which a vehicle comes into a composition for photographing the subject in the tracking apparatus.

If a vehicle H comes into a composition for photographing the subject A as an additional subject as shown in FIG. 19, the tracking feature detection circuit 1307 calculates a tracking position of the vehicle H in accordance with luminance and color information as the feature amount of the vehicle H, and sets a luminance/color information tracking area G2 to track the vehicle H in accordance with the luminance and the color information.

The subject A and the vehicle H are included as shown in FIG. 19 if the number of groups at the first tracking position (focus detection area C) is "2 or more" as the focus detection area groups C1 and C2, for example, as shown in FIG. 18 and when the second tracking position of the vehicle H (part having the face, the luminance, and the color as the feature amount of the vehicle H) is not included in the focus detection area group C1 of the subject A in the case shown in FIG. 19.

Figure 20:
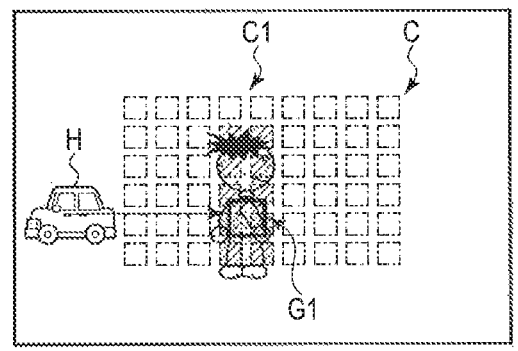
FIG. 20 is a diagram showing a tracking result in which the vehicle comes into the composition for photographing the subject in the tracking apparatus.

The tracking circuit 1309 sets the focus detection area group C1 including the second tracking position as shown in FIG. 20 as the first tracking position (focus detection area C), and updates the standard focus detection areas C in accordance with the focus information regarding the first tracking position.

Therefore, even if the vehicle H comes into the composition for photographing the subject A, the tracking target does not transfer from the subject A to the subject E, and the subject A can be kept tracked as the tracking target.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tracking apparatus comprising:
    a group setting circuit which groups a plurality of focus detection areas in image data including a tracking target;
    a feature detection circuit which detects a feature amount of the tracking target in areas of one or more of the plurality groups grouped by the group setting circuit;
    a tracking circuit which:
        sets the focus detection area focused on the tracking target as a first tracking position,
        sets an area having the feature amount detected by the feature detection circuit as a second tracking position,
        performs a priority tracking position determination to set the first tracking position or the second tracking position as a priority tracking position based on the number of groups set by the group setting circuit, and
        tracks the tracking target in accordance with the first or second tracking position based on the priority tracking position determination;
    a display circuit which displays an image based on the image data and a tracking frame indicative of a position of the tracking target; and
    a control circuit which
        provides, when the image data is recorded as a still image, an instruction not to display the tracking frame after an instruction for still image photography and thereafter records a still image file based on the image data in a recording medium together with a position of the tracking target, and
        records, when the image data is recorded as a moving image, a moving image file based on the image data in a recording medium, successively records a position of the tracking target in a recording medium, and provides an instruction not to display the tracking frame after an instruction to end moving image photography.

2. The tracking apparatus of claim 1, wherein the tracking circuit performs the priority tracking position determination in accordance with a focus state of the focus detection areas.

3. The tracking apparatus of claim 1, wherein the group setting circuit groups the plurality of focus detection areas in accordance with a focus state among the focus detection areas in image data including a tracking target.

4. The tracking apparatus of claim 1, wherein the group setting circuit groups the plurality of focus detection areas in accordance with a difference between focus information regarding the focus detection areas and standard focus information.

5. The tracking apparatus of claim 4, wherein when the group setting circuit groups the plurality of focus detection areas based on whether the difference between the focus information regarding the focus detection areas is less than a threshold.

6. The tracking apparatus of claim 1, wherein the tracking circuit sets the second tracking position as the priority tracking position when there are no groups set by the group setting circuit.

7. The tracking apparatus of claim 1, wherein the tracking circuit sets the first tracking position as the priority tracking position when one group is set by the group setting circuit.

8. The tracking apparatus of claim 1, wherein the tracking circuit sets the first tracking position as the priority tracking position when two or more groups are set by the group setting circuit and the groups include a group including the second tracking position.

9. The tracking apparatus of claim 1, wherein the tracking circuit sets the second tracking position as the priority tracking position when two or more groups are set by the group setting circuit and none of the groups include the second tracking position.

10. The tracking apparatus according to claim 1, wherein the image data includes a plurality of successive frame images, and
    the tracking circuit updates the first or second tracking position for each of the successive frame images to track the tracking target.

11. A tracking system comprising:
    an imaging device which obtains image data;
    a group setting circuit which groups a plurality of focus detection areas in the image data including a tracking target;
    a feature detection circuit which detects a feature amount of the tracking target in areas of one or more of the plurality groups grouped by the group setting circuit;
    a tracking circuit which:
        sets the focus detection area focused on the tracking target as a first tracking position,
        sets an area having the feature amount detected by the feature detection circuit as a second tracking position,
        performs a priority tracking position determination to set the first tracking position or the second tracking position as a priority tracking position based on the number of groups set by the group setting circuit, and tracks the tracking target in accordance with the first or second tracking position based on the priority tracking position determination;

a display circuit which displays an image based on the image data and a tracking frame indicative of a position of the tracking target; and a control circuit which provides, when the image data is recorded as a still image, an instruction not to display the tracking frame after an instruction for still image photography and thereafter records a still image file based on the image data in a recording medium together with a position of the tracking target, and records, when the image data is recorded as a moving image, a moving image file based on the image data in a recording medium, successively records a position of the tracking target in a recording medium, and provides an instruction not to display the tracking frame after an instruction to end moving image photography.

12. The tracking system of claim 11, wherein the tracking circuit sets the second tracking position as the priority tracking position when there are no groups set by the group setting circuit.

13. The tracking system of claim 11, wherein the tracking circuit sets the first tracking position as the priority tracking position when one group is set by the group setting circuit.

14. The tracking system of claim 11, wherein the tracking circuit sets the first tracking position as the priority tracking position when two or more groups are set by the group setting circuit and the groups include a group including the second tracking position.

15. The tracking system of claim 11, wherein the tracking circuit sets the second tracking position as the priority tracking position when two or more groups are set by the group setting circuit and none of the groups include the second tracking position.

16. A tracking method comprising:

obtaining image data using an imaging device;

grouping a plurality of focus detection areas in the image data including a tracking target;

detecting a feature amount of the tracking target in areas of one or more of the plurality groups;

setting the focus detection area focused on the tracking target as a first tracking position, setting an area having the detected feature amount as a second tracking position, performing a priority tracking position determination to set the first tracking position or the second tracking position as a priority tracking position based on the set number of groups, tracking the tracking target in accordance with the first or second tracking position based on the priority tracking position determination;

displaying an image based on the image data and a tracking frame indicative of a position of the tracking target;

providing, when the image data is recorded as a still image, an instruction not to display the tracking frame after an instruction for still image photography and thereafter recording a still image file based on the image data in a recording medium together with a position of the tracking target, and recording, when the image data is recorded as a moving image, a moving image file based on the image data in a recording medium, successively recording a position of the tracking target in a recording medium, and providing an instruction not to display the tracking frame after an instruction to end moving image photography.

17. The tracking method of claim 16, wherein the second tracking position is set as the priority tracking position when there are no set groups.

18. The tracking method of claim 16, wherein the first tracking position is set as the priority tracking position when there is one set group.

19. The tracking method of claim 16, wherein the first tracking position is set as the priority tracking position when there are two or more set groups and the groups include a group including the second tracking position.

20. The tracking method of claim 16, wherein the second tracking position is set as the priority tracking position when there are two or more set groups and none of the groups include the second tracking position.

21. The tracking apparatus of claim 1, wherein the tracking circuit:

sets the second tracking position to the position of the tracking target when there are no groups set by the group setting circuit, sets the first tracking position to the position of the tracking target and updates a standard area to the first tracking position when one group is set by the group setting circuit;

sets the first tracking position included in the second tracking position to the position of the tracking target and updates the standard area to the first tracking position included in the second tracking position when two or more groups are set by the group setting circuit and the groups include a group including the second tracking position, and sets the second tracking position to the position of the tracking target and updates the standard area to the second tracking position when two or more groups are set by the group setting circuit and none of the groups include the second tracking position.

* * * * *